United States Patent
Schannath

(10) Patent No.: US 11,032,449 B2
(45) Date of Patent: Jun. 8, 2021

(54) GLOVE-LIKE DEVICE WITH ERGONOMICALLY ADVANTAGEOUSLY ACTIVATABLE CAMERA INTEGRATED THEREIN

(71) Applicant: Christina Schannath, Münsing (DE)

(72) Inventor: Christina Schannath, Münsing (DE)

( * ) Notice: Subject to any disclaimer, the term of this patent is extended or adjusted under 35 U.S.C. 154(b) by 0 days.

(21) Appl. No.: 16/063,629

(22) PCT Filed: Dec. 15, 2016

(86) PCT No.: PCT/EP2016/081144
§ 371 (c)(1),
(2) Date: Jun. 18, 2018

(87) PCT Pub. No.: WO2017/102922
PCT Pub. Date: Jun. 22, 2017

(65) Prior Publication Data
US 2018/0376043 A1    Dec. 27, 2018

(30) Foreign Application Priority Data
Dec. 18, 2015  (DE) .................... 10 2015 122 281.7

(51) Int. Cl.
H04N 5/225    (2006.01)
H04N 5/232    (2006.01)
(Continued)

(52) U.S. Cl.
CPC .......... *H04N 5/2251* (2013.01); *A41D 1/002* (2013.01); *A41D 19/0024* (2013.01);
(Continued)

(58) Field of Classification Search
CPC .. H04N 5/2257; H04N 5/22525; H04N 5/232; H04N 5/2251; A41D 31/102;
(Continued)

(56) References Cited

U.S. PATENT DOCUMENTS

| 4,950,868 A | 8/1990 | Moss et al. |
| 6,159,013 A * | 12/2000 | Parienti .................... A61F 9/08 434/112 |

(Continued)

FOREIGN PATENT DOCUMENTS

| CN | 101354609 A | 1/2009 |
| CN | 104747917 A | 7/2015 |

(Continued)

OTHER PUBLICATIONS

Uniqa, "Handycam", 2014, 4 pages. <http://www.uniqagroup.com/gruppe/versicherung/press/press_release/archive/2014/UNIKATE.html>.

(Continued)

*Primary Examiner* — Gevell V Selby
(74) *Attorney, Agent, or Firm* — Mannava & Kang, P.C.; Timothy B. Kang

(57) ABSTRACT

The invention proposes a glove-like device which has a carrier structure, a camera and a switching arrangement. The camera is designed to record an image or series of images when it receives a contact signal. The carrier structure is designed, in the manner of a glove or of a cuff, to be readily fastened on a user's hand and/or wrist such that, in a state in which it has been drawn over the hand, at least some parts of the carrier structure enclose the user's hand. The camera and the switching arrangement are fastened on the carrier structure. The switching arrangement has an actuable component which is specifically arranged, and designed, such that it can be actuated by virtue of the user's thumb executing an actuating movement in the direction of a finger of the same hand and/or in the direction of a finger joint of the same hand, and which thus activates the contact signal and passes the latter on to the camera. In particular for activities such as, for example, many types of sport in which a user protects his hands in any case in gloves, the glove-like (Continued)

device described can make it possible for the user to record images in a straightforward and ergonomically intuitive manner.

14 Claims, 3 Drawing Sheets

(51) Int. Cl.
  A41D 31/102 (2019.01)
  A41D 1/00 (2018.01)
  A41D 19/00 (2006.01)
  G03B 17/08 (2021.01)
  G03B 17/56 (2021.01)
  G03B 29/00 (2021.01)
  G06F 3/01 (2006.01)

(52) U.S. Cl.
  CPC .......... *A41D 31/102* (2019.02); *G03B 17/08* (2013.01); *G03B 17/561* (2013.01); *G03B 29/00* (2013.01); *G06F 3/014* (2013.01); *H04N 5/2257* (2013.01); *H04N 5/22525* (2018.08); *H04N 5/232* (2013.01); *A41D 2400/10* (2013.01)

(58) Field of Classification Search
  CPC ............... A41D 19/0024; A41D 1/002; A41D 2400/10; G06F 3/014; G03B 29/00; G03B 17/561; G03B 17/08
  See application file for complete search history.

(56) References Cited

U.S. PATENT DOCUMENTS

| | | | |
|---|---|---|---|
| 7,057,604 | B2 | 6/2006 | Bajramovic |
| 8,009,141 | B1 | 8/2011 | Chi et al. |
| 8,485,681 | B2 | 7/2013 | Richter |
| 8,528,117 | B2 | 9/2013 | Asiaghi |
| 9,438,743 | B1* | 9/2016 | Lee .................... A41D 19/0157 |
| 2003/0137489 | A1 | 7/2003 | Bajrarnovic |
| 2004/0250333 | A1 | 12/2004 | Friedman |
| 2007/0181620 | A1 | 8/2007 | Carver |
| 2011/0043496 | A1 | 2/2011 | Ray Avalani |
| 2012/0274546 | A1 | 11/2012 | Dalton |
| 2015/0130698 | A1 | 5/2015 | Burgess |
| 2015/0237181 | A1* | 8/2015 | Khan .................. H04M 1/0202 455/556.1 |
| 2015/0355716 | A1* | 12/2015 | Balasubramanian ... G06F 3/017 345/173 |
| 2016/0054645 | A1* | 2/2016 | Contino ............. H04N 5/23296 348/211.99 |
| 2016/0161301 | A1 | 6/2016 | Guenther et al. |
| 2016/0171907 | A1* | 6/2016 | Moore ................. G09B 21/001 434/116 |
| 2017/0338610 | A1 | 11/2017 | Brunnbauer et al. |

FOREIGN PATENT DOCUMENTS

| | | | | |
|---|---|---|---|---|
| DE | 102005011432 | A1 | 9/2006 | |
| DE | 102005063198 | B4 | 5/2009 | |
| DE | 102015113847 | A1 | 4/2014 | |
| DE | 102015111506 | | 4/2016 | |
| DE | 102016109113 | A1 | 11/2017 | |
| DE | 102016109117 | A1 | 11/2017 | |
| EP | 2720444 | A1 * | 4/2014 | ............. H04M 1/67 |
| GB | 2422527 | A | 8/2006 | |
| GB | 2444105 | A | 5/2008 | |
| GB | 2484780 | A | 4/2012 | |
| GB | 2550492 | A | 11/2017 | |
| JP | H05104480 | A | 4/1993 | |
| JP | H10225315 | A | 8/1998 | |
| JP | 2003018443 | A | 1/2003 | |
| JP | 52924444 | B2 | 9/2013 | |
| KR | 1020040015777 | A | 2/2004 | |
| KR | 101267118 | B1 | 5/2013 | |
| WO | WO-2014055240 | A2 | 4/2014 | |
| WO | WO-2015175838 | A1 | 11/2015 | |

OTHER PUBLICATIONS

John Weir, "Hand-Tech Camera Glove Shows Off the Future Wearable Tech", Aug. 14, 2013, 4 pages.

International Search Report and Written Opinion dated Mar. 10, 2017, PCT Patent Application No. PCT/EP2016/081144, filed Dec. 15, 2016, EPO, 12 pages.

* cited by examiner

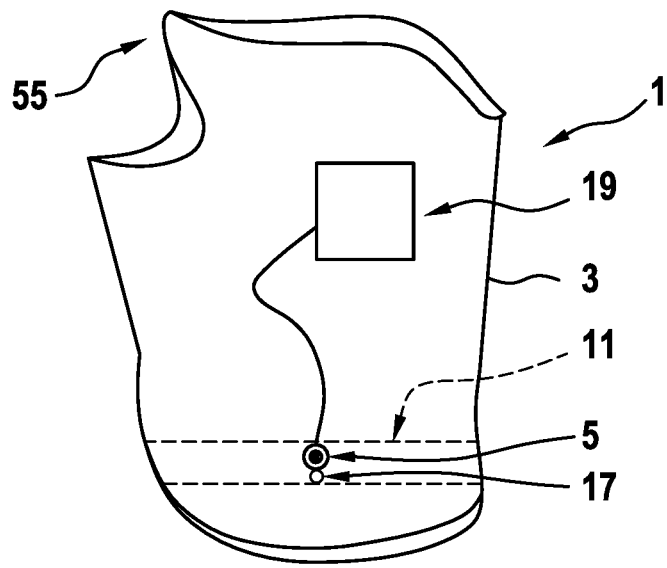
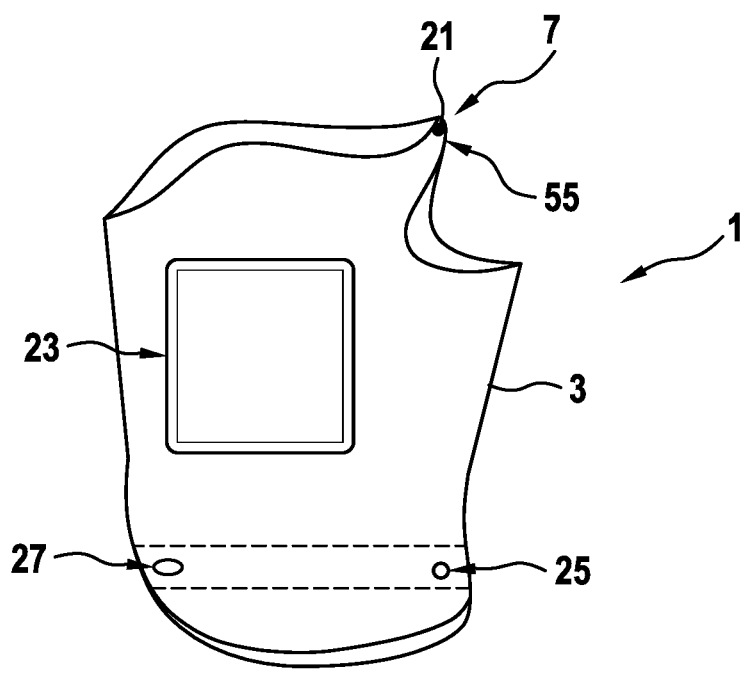

GLOVE-LIKE DEVICE WITH ERGONOMICALLY ADVANTAGEOUSLY ACTIVATABLE CAMERA INTEGRATED THEREIN

CLAIM FOR PRIORITY

The present application is a national stage filing under 35 U.S.C. § 371 of PCT application number PCT/EP2016/081144, having an international filing date of Dec. 15, 2016, which claims priority to German Patent Application Number 10 2015 122 281.7, having a filing date of Dec. 18, 2015, the disclosures of which are hereby incorporated by reference in their entireties.

FIELD OF THE INVENTION

The present invention relates to a glove-like device with an integrated camera.

TECHNICAL BACKGROUND

Cameras, with which individual images or even entire image sequences may be recorded, not only exist today as devices designed exclusively for this purpose, such as photo cameras or film cameras, but are increasingly also being integrated into other devices, which were mainly designed for the implementation of other functionalities. A possible miniaturization of cameras now allows cameras to be integrated into mobile phones, portable computers and other electronic devices, for example. In most cases, a user nowadays already owns several devices equipped with camera functions, wherein, for example, it may be decided which device is used to record an image depending on the situation.

Users often carry a mobile phone with them anyway and use its camera function to take pictures. However, it has been observed that during certain activities, for example during sports activities, removing a mobile phone, for example from a bag or rucksack, unlocking the mobile phone if necessary, selecting a camera function on the mobile phone and then triggering the camera function to take the picture are perceived by a user as cumbersome and complex.

SUMMARY OF THE INVENTION AND ADVANTAGEOUS EMBODIMENTS

There may therefore be a need for an alternative possibility for simple and fast recording of images or image sequences. In particular, there may be a need for a device that may be used to take pictures or sequences of pictures in certain situations, particularly during sporting activities such as cross-country skiing, downhill skiing, cycling, jogging, surfing, etc., without great effort and, in particular, without having to interrupt the activity significantly. In particular, such a device should be easy and ergonomic to operate.

Such needs may be met with the subject matter of the independent claim of the present patent application. Advantageous embodiments of the invention are defined in the dependent claims and the following description.

According to one aspect of the present invention, a glove-like device is described, which has a carrier structure, a camera and a switching arrangement. The camera is configured to capture an image or a sequence of images when receiving a contact signal. The carrier structure is configured to be attached to a user's hand and/or wrist without any further provisions in such a way that, when pulled over the hand, at least parts of the carrier structure surround the user's hand. The camera and the switching arrangement are attached to the carrier structure. The switching arrangement has a component to be actuated, which is arranged and configured in such a way that it is actuated by an actuation movement of a thumb of the user towards a finger of the same hand and/or towards a finger joint of the same hand, thereby triggering the contact signal and forwarding it to the camera.

Possible features and advantages of embodiments of the invention may, among other things and without restricting the invention, be regarded as being based on the findings and ideas described below.

Based on the needs mentioned above, it was recognized that users wear gloves in many situations, especially during various sporting activities, or at least could wear glove-like devices without any problems.

For example, in activities carried out at low temperatures, such as skiing, cycling or jogging in winter, etc., it is common for a user to wear gloves to protect himself from the cold. In other activities, it may be common to wear gloves to protect hands from injury, for example. In particular in such situations where a user wears gloves, it was previously considered cumbersome to take pictures using a separately available device such as a camera or a mobile phone with photo function, since the gloves first had to be taken off regularly in order to be able to handle the separate device properly.

It is therefore proposed to provide a glove-like device that may be worn by a user at the hand instead of or in addition to a glove that protects against cold or injury, for example, and to equip this glove-like device with a camera function that is easy and ergonomically advantageous to handle.

The glove-like device may be provided with a structure herein referred to as a carrier structure, which itself may be configured as a kind of glove, in which case it may be pulled over the hand of the user in such an embodiment and cover at least parts of the hand including the palm, the back of the hand and some or all fingers partially or completely. In such an embodiment, the carrier structure of the glove-like device may surround parts or the whole of the user's hand and come into direct contact with the user's hand on an inside.

Alternatively, the glove-like device may also be configured to be covered with its carrier structure over a glove, so that although it also surrounds parts or all of the user's hand, it is not in direct contact with its inside to the hand but to a surface of the glove. The glove-like device may be attached to the entire hand, for example by surrounding the hand and/or fingers with its carrier structure. Alternatively or in addition, the glove-like device may be attached to a user's wrist, e.g. similar to a bandage, but does not need to completely surround the hand itself in this case.

The glove-like device may be equipped with a camera function by attaching a camera to or integrating a camera into its carrier structure. The camera is thus automatically carried by the user as part of the glove-like device when he pulls the glove-like device over his hand to protect it against cold or injury, for example.

The fact that camera functions may nowadays be implemented with the help of miniaturized cameras, for example in the form of light-sensitive microchips equipped with miniaturized optics, and that such an implementation may be realized simply, with low weight, robustly and at low cost, may be used positively. For example, a camera may be implemented as a CCD chip (Charge Coupled Device) or CMOS chip (Complementary Metal-Oxide Semiconductor) as a miniaturized semiconductor device. Such a camera integrated into the glove-like device may be able to take single at least two-dimensional images or a sequence of images, for example in the form of a video film.

In order to make the camera function implemented in this way particularly easy to use for a user of the glove-type device, an ergonomically easy to handle switching arrangement for the glove-type device is proposed. The switching arrangement, like the camera, is attached to the carrier structure and thus forms an integral part of the glove-like device. The switching arrangement shall have a component to be actuated, which is arranged on the carrier structure and is configured in such a way that the user may actuate it by an actuating movement, preferably only a single actuating movement, in which he moves his thumb towards a finger of the same hand or a finger joint of the same hand, and the component to be actuated thereby triggers the contact signal, as a result of which the camera is then triggered and records an image or a sequence of images.

It has been recognised that such an actuating movement may be carried out particularly easily and ergonomically by a user of the glove-type device, so that he may intuitively use its camera function with the help of the glove-type device in order to be able to take pictures or sequences of pictures quickly and without considerable effort.

For example, a skier, cyclist or jogger wearing the glove-like device may only position his hand and thus the glove-like device in such a way that the integrated camera is directed at an object of interest to him and then trigger the recording of the image or the sequence of images by means of the simple actuating movement. There is no need to take a separate device out of a bag, for example, nor does the user have to take off his glove. Instead, the user may trigger the recording of an image or a sequence of images with a simple and ergonomically intuitive movement through the suitably designed switching arrangement using the camera integrated in the glove-like device.

In a simple embodiment, for example, the switching arrangement may have a push switch or push button that may be depressed by the actuating movement of the user's thumb, thereby triggering the contact signal, for example by closing an electrical circuit.

Alternatively or in addition, the switching arrangement may also be implemented with other technical implementations that enable the actuating movement of the user's thumb to be detected. For example, a switching arrangement may detect a change in an electrical capacitance and/or an electrical inductance and/or a magnetic field caused by approaching the thumb and, as a result, may then trigger the contact signal. Optical sensors are also conceivable as part of a switching arrangement.

An appropriate configuration of the switching arrangement may play a special role in the presented glove-like device. On the one hand, the switching arrangement should be designed in such a way that it may be operated simply and ergonomically by means of the actuating movement. On the other hand, operating errors should be avoided as much as possible.

For example, the switching arrangement should be configured in such a way that contact signals are not inadvertently triggered, for example by contacting the component to be actuated by an object other than the user's thumb. For example, when used as a ski glove, gripping around a ski pole should not inadvertently be interpreted as an actuating movement resulting in a contact signal being triggered.

Accordingly, the switching arrangement should advantageously be configured mechanically, electrically and/or in another physical way such that to be triggered only by actual actuating movements through the user's thumb, but not due to other events.

For example, the switching arrangement may be equipped with a switch and/or push-button which must be actuated with a certain minimum actuating force in order to trigger the contact signal. Alternatively or additionally, a switch or push-button may be surrounded by a ring-like projection, so that large objects cannot reach the switch or push-button and thus cannot operate it, but the user's thumb may certainly operate the switch or push-button due to its rounded contour or its elastic surface.

According to an embodiment, the switching arrangement may have a securing component which, in a secured state, prevents the contact signal from being triggered and which may be transferred to an unsecured state in order to permit the contact signal to be triggered by the actuating movement.

In other words, the switching arrangement may be configured in such a way that the contact signal cannot merely be triggered by the actuation movement of the user's thumb alone, but instead the securing component may have to be released beforehand. In this way, the switching arrangement may be protected against unintentional actuation.

In the secured state, the securing component may prevent the contact signal from being triggered in various ways. For example, it may be prevented that the switching arrangement is mechanically actuated at all, for example by mechanically securing a pressure switch/push-button against being pressed down. Alternatively, the securing component may prevent a contact signal from being triggered during such mechanical actuation, for example by interrupting a signal path such as an electrical line used for signal transmission.

If the user actually wants to take an image, he must first transfer the securing component to its unsecured state in order to then be able to trigger the contact signal by the actuating movement. The securing component may be configured in such a way that the transfer to the unsecured state has to take place in a different way, for example by a different movement, than the triggering of the contact signal by the actuating movement. For example, it is conceivable that the securing component could be released by a sliding movement, whereas the contact signal would have to be triggered by a pressure movement serving as an actuating movement, so that the two movements would have to take place in different directions. This may reduce the probability of accidental triggering of the contact signal.

Alternatively or additionally, another switch could be provided on the glove-type device, for example, which as a securing component may prevent the contact signal from being triggered and which is arranged at a distance from the area of the switching arrangement to be actuated by the actuating movement. In this case, it is only possible to take an image if the user also actuates the securing component elsewhere on the glove-like device and transfers it to its unsecured state before or simultaneously with his actuation movement.

Another alternative embodiment of a securing component may, for example, be to permanently monitor the actuation of the switching arrangement and to distinguish between intentional and unintentional actuation by the fact that an actual actuating movement must take place with a certain time pattern. For example, the securing component may be configured such that the contact signal is only triggered if the switching arrangement has been actuated several times in short succession by actuating movements or, alternatively, if the switching arrangement has been actuated once or several times for unusually long periods, for example at least 1s or at least 3s.

Another alternative would be securing and/or unsecuring using speech recognition. In this case, a user may enter commands such as "on" or "off" via a microphone integrated in the glove-like device and thus cause the glove-like device to be unlocked and thus "armed" in order to be able to subsequently trigger the recording of images by simple thumb movements.

According to an embodiment, in addition to the component to be actuated, the switching arrangement may have a special actuating component and be configured to generate the contact signal only when the actuating component is brought into mechanical contact with the component to be actuated.

In other words, provisions may be made such that it may not be possible to operate the component to be actuated with any object that comes into contact with it. Instead, the switching arrangement may be configured in such a way that the component to be actuated may only be actuated with the specially provided actuating component. This also prevents false triggering of contact signals.

For example, the component to be actuated may be a type of reed contact which may be actuated magnetically. A small magnet may then be used as an actuating component. The actuating component may be provided at a suitable location on the carrier structure, in particular where, when the glove-like device is put on, it is adjacent to the user's thumb and may therefore be moved with the thumb during the actuating movement. When the magnet is brought close to or preferably into mechanical contact with the reed contact, the reed contact is closed and triggers the contact signal. However, if other objects made of non-magnetic material, such as a ski pole, come into contact with the component to be actuated, this will not result in triggering the contact signal. Only through the mechanical contact between the actuating component and the component to be actuated, for example, a switching state of a circuit may be changed and thereby the contact signal may be triggered.

According to an embodiment, the component to be actuated of the switching arrangement is mounted on the carrier structure at a position which, when pulled over the hand, lies on a side of the index finger and/or the index finger joint opposite the thumb.

In other words, it has been recognised as advantageous to place the component to be actuated by the user at such a position on the carrier structure of the glove-like device that, when the glove-like device is pulled over the user's hand, it lies on one side of the index finger or index finger joint and may therefore be operated simply and ergonomically intuitively by the user's thumb.

According to an embodiment, the camera may be attached to the carrier structure at a position that, in the state pulled over the hand, lies on the palm and/or wrist, especially on the underside of the wrist.

In other words, it has been recognised that it may be beneficial for ergonomic and intuitive handling of the glove-type device to place the camera attached to the carrier structure at a position that the user may intuitively point to the object to be captured in order to take an image, but without placing the camera preferably in an area such as the fingers or inner side surface of a hand, which is often exposed to strong mechanical stress and/or deformation in the normal use of a glove.

According to an embodiment, at least the switching arrangement and/or the camera is encapsulated watertight.

Preferably, other components of the glove-like device such as the camera's optics, control electronics, electrical connections, etc. are also encapsulated watertight. Sensitive components of the glove-like device may thus be protected against damage by penetrating water.

This may protect the sensitive electrical components, especially when using the glove-like device in humid environments such as outdoors in rain or snow.

Watertight encapsulation may take place in various ways. For example, the components may be housed in their own hermetically sealed housings. Alternatively, the components may be surrounded by waterproof layers, for example in the form of waterproof membranes or foils. As a further alternative, the components may be cast into a sealing compound.

According to an embodiment, the switching arrangement is also equipped with an anti-bounce arrangement which suppresses the generation of several switching signals by a single actuating movement.

In other words, provisions may be taken on the switching arrangement to prevent a single targeted actuation of the switching arrangement by a single actuating movement from inadvertently triggering several switching signals and thus inadvertently leading to the recording of several images.

According to an embodiment, the carrier structure is made of a flexible but essentially not elastically stretchable material.

In other words, although the carrier structure may be bent flexibly or even folded, the material of the carrier structure should at most be able to marginally expand elastically, i.e. for example by less than 20% or less than 10% of its width and/or length, preferably less than 2% of its width or length. For example, different textiles and/or films and/or composite materials may be used as materials. Similar to an ordinary glove, the carrier structure may be made up of several layers of material, such as an outer, mechanically resistant layer, an inner, thermally insulating layer and possibly a waterproof and preferably breathable layer accommodated between these two layers. The components such as the switching arrangement and the camera may then be attached to the carrier structure or integrated into the carrier structure and may thereby be mechanically stabilized and/or accommodated such as to be protected from environmental influences.

According to an embodiment, the glove-like device also has a display attached to the carrier structure and configured to display images taken by the camera. The display may be embodied especially advantageous as a flexible display.

In other words, the glove-type device may not only take pictures with the help of its camera, but it may also be intended to be able to display these pictures directly with the help of a display also attached to the carrier structure of the glove-type device. Since the display should be much larger than the camera or the switching arrangement in order to be visible to the user, it may be advantageous to provide a flexible display instead of a rigid display, as it is used in mobile phones, for example, which may be bent in narrow bending radii of less than 10 cm, preferably less than 5 cm and even less than 1 cm, without irreversible damage. Such a flexible display may be easily fitted to the carrier structure of the glove-type device without, for example, restricting the mobility of the hand of the user carrying the device or being damaged upon movements of the glove-type device itself.

According to an embodiment, the display is attached to the carrier structure at a position which, in the state pulled over the hand, lies on the back of the hand and/or the wrist, in the latter case especially on the upper side of the wrist. At such a place, the display is simply visible to the user. In particular, the user may ergonomically and intuitively, for example, align the camera on the underside of the wrist or the ball of the thumb with his hand towards an object in front of him and observe an image taken by the camera using the display on the back of the hand, for example.

It is pointed out that a person skilled in the art will recognize that the features described above in connection with embodiments of the invention may be exchanged or combined with one another in an appropriate manner and may be modified or supplemented in order to achieve further embodiments of the invention and possibly synergy effects in this way.

BRIEF DESCRIPTION OF THE DRAWINGS

Further features and advantages of the present invention become apparent to a person having skills in the art from the following description of exemplary embodiments and with reference to the accompanying drawings, wherein neither the description nor the drawings are to be interpreted as restricting the invention.

FIG. 2 and FIG. 3 show a top view from below and from above of a glove-like device according to an alternative embodiment of the present invention.

The details shown in the figures are only schematically illustrated and not reproduced to scale. Same reference signs indicate same features or features of same effect in the figures.

DETAILED DESCRIPTION OF PREFERRED EMBODIMENTS

Figure 1:
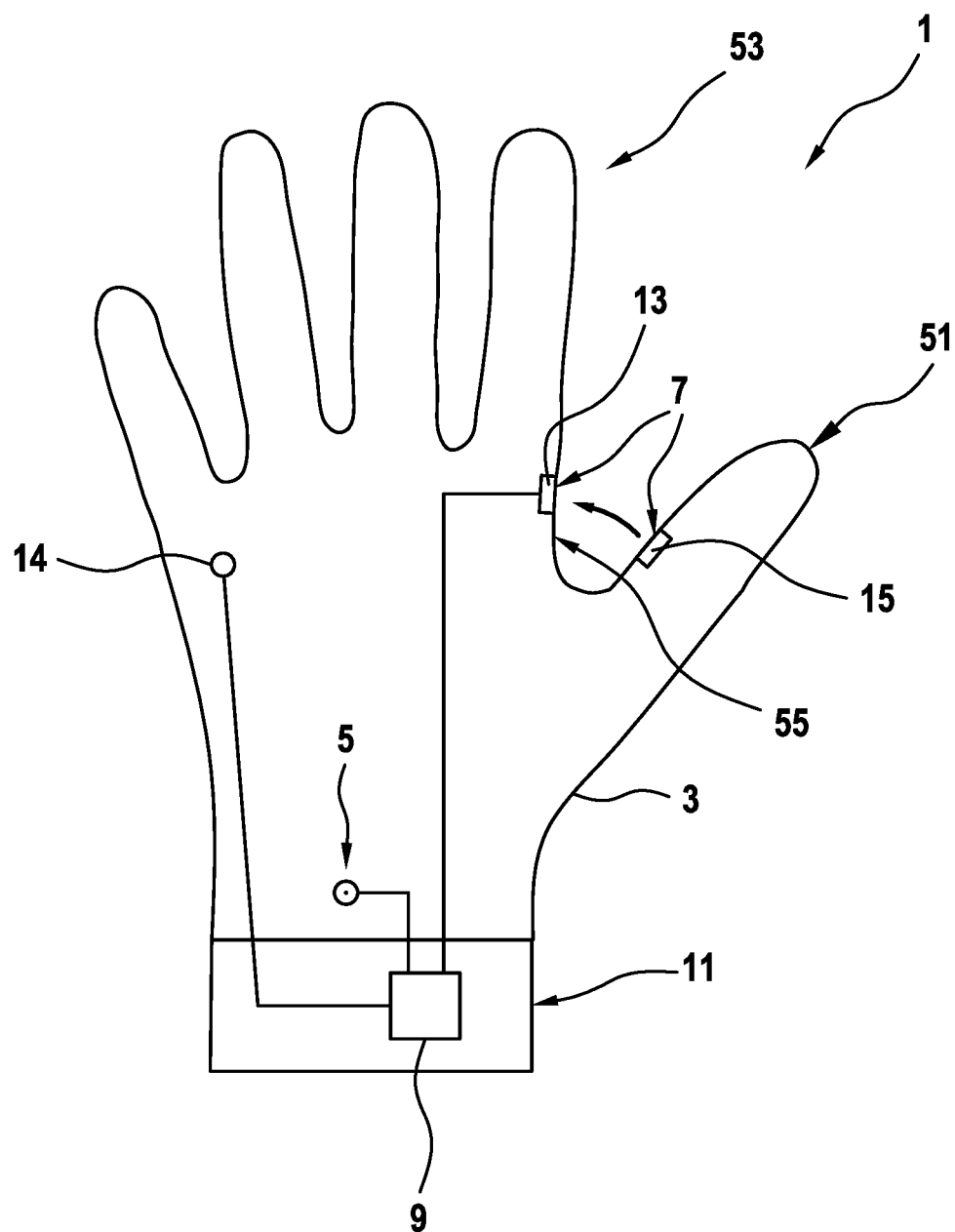
FIG. 1 shows a glove-like device according to an embodiment of the present invention.

FIG. 1 shows a glove-like device 1 in the form of a glove that may be pulled over a user's hand. The glove-like device 1 comprises a carrier structure 3. This carrier structure 3 corresponds essentially to a conventional glove in form and function. The carrier structure 3 is made up of one or more textile material layers that are flexible but essentially not elastically extensible.

To give the glove-like device 1 a camera function, a camera 5 is attached to the carrier structure 3. Camera 5 is preferably miniaturised in such a way that its surface covers only a small part of the surface of carrier structure 3, for example less than 2 cm². For example, the camera 5 may be embodied in a similar way as cameras included in mobile phones. In particular, the camera 5 may comprise a two-dimensional image sensor, for example in the form of a CCD chip or a CMOS chip. In addition, the camera 5 may have an optics, preferably a miniaturized optics and especially preferably an auto-focusing optics.

Camera 5 is connected to a central control unit 9. Therein, one the one side, the camera 5 may transmit image data recorded by it to the central control unit 9, on the other side, the central control unit 9 may control the function of the camera 5.

In the example shown, the central control unit 9 is arranged in the area of a cuff 11 of the glove-like device 1 and the camera 5 is arranged just above, i.e. in the area adjacent to a palm or a wrist of the user. This means that the central control unit 9 and the camera 5 hardly hinder any movement of the user's hand on the one side, and, on the other side, the camera 5 may be positioned particularly in a position where it is not easily covered by a user's jacket sleeve, for example.

A special switching arrangement 7 is provided on the glove-like device 1 to enable images to be taken easily and ergonomically intuitively with the camera 5. This switching arrangement 7 is designed in such a way that the user may perform a kind of actuation movement by moving his thumb 51 towards his index finger 53 or towards the associated finger joint 55, as a result of which the switching arrangement 7 triggers a contact signal, which in turn causes the camera 5 to take one or more images.

In the example shown, the switching arrangement 7 is constructed in two parts. On the one hand, a component 13 to be actuated is arranged in the area adjacent to the index finger 53 or finger joint 55. This component 13 to be actuated, for example, may be a switchable contact that closes a circuit when actuated and may thus trigger the contact signal. An actuating component 15 is provided in the area of the opposite thumb 51 of the same hand, which actuates the component 13 to be actuated when approaching the component 13 to be actuated and in particular when there is mechanical contact with it. For example, the component 13 to be actuated may be a reed contact and the actuating component 15 may be a small magnet that closes the reed contact when approaching the reed contact so that the contact signal is triggered.

In an alternative or supplementary embodiment, the switching arrangement 7 may additionally have a securing component 14 which may be transferred from a secured state to an unsecured state and vice versa, wherein it prevents triggering the contact signal in the secured state but permits this in the unsecured state. Such a securing component 14 may be implemented in different ways. For example, as indicated in FIG. 1, the securing component may be provided as a kind of supplementary component to be actuated, which must be actuated simultaneously or prior to actuation of the component 13 to be actuated to actuate the contact signal in order to actually trigger the contact signal and thus trigger the acquisition of an image by the camera 5.

FIGS. 2 and 3 show a view from below and a view from above of an alternative embodiment of a glove-like device 1. In this case, the glove-like device 1 is not designed as a whole glove, but merely as a kind of glove cuff which, in a state pulled over the hand of a user, surrounds only parts of the user's hand, in particular his wrist and a lower part of the hand including the ball of the hand and an index finger joint 55. Such a cuff type device 1 may be pulled both directly over the user's hand and, if necessary, over a conventional glove already covering this hand. The carrier structure 3 of the glove-like device 1 is designed in such a way that it may be attached to the user's hand or wrist without any further provisions, i.e. for example without additional straps, belts or similar, which are not themselves part of the carrier structure 3, in such a way that it at least partially surrounds the user's hand when pulled over the hand and is held on it.

As shown in FIG. 2, the camera 5 is provided on one side of the glove-like device 1 in the area of a cuff 11 surrounding the wrist. A miniaturized microphone 17 may be located directly next to camera 5.

As shown in FIG. 3, the carrier structure 3 of the glove-like device 1 has a large and preferably flexible display 23 on an opposite surface, on which images taken by the camera 5, among other things, may be displayed. The display 23 may preferably be touch-sensitive, i.e. designed as a so-called touch screen.

Furthermore, a status LED 27 is provided on the carrier structure 3. For example, the status LED may light up in different colours and/or switch on and off in different time patterns, thus visualising the current status of the camera function of the glove-type device 1.

In addition, further sensors such as a proximity sensor 25 may be provided. Such a proximity sensor 25 may detect near objects without physical contact being necessary. Such sensors may be used, for example, to switch a display on or off with one hand movement without touching the glove.

A switching arrangement 7 is provided adjacent to a position in which the carrier structure 3, when mounted on the user's hand, is adjacent to the index finger 53 or the corresponding finger joint 55 of the hand. In this case, the switching arrangement is designed as a simple switch or button 21 that may be actuated by mechanical contact. If necessary, a securing component 14 may also be provided, which may be used to suppress readout of the contact signal by push-button 21 until the securing component 14 has been released.

Figure 4:
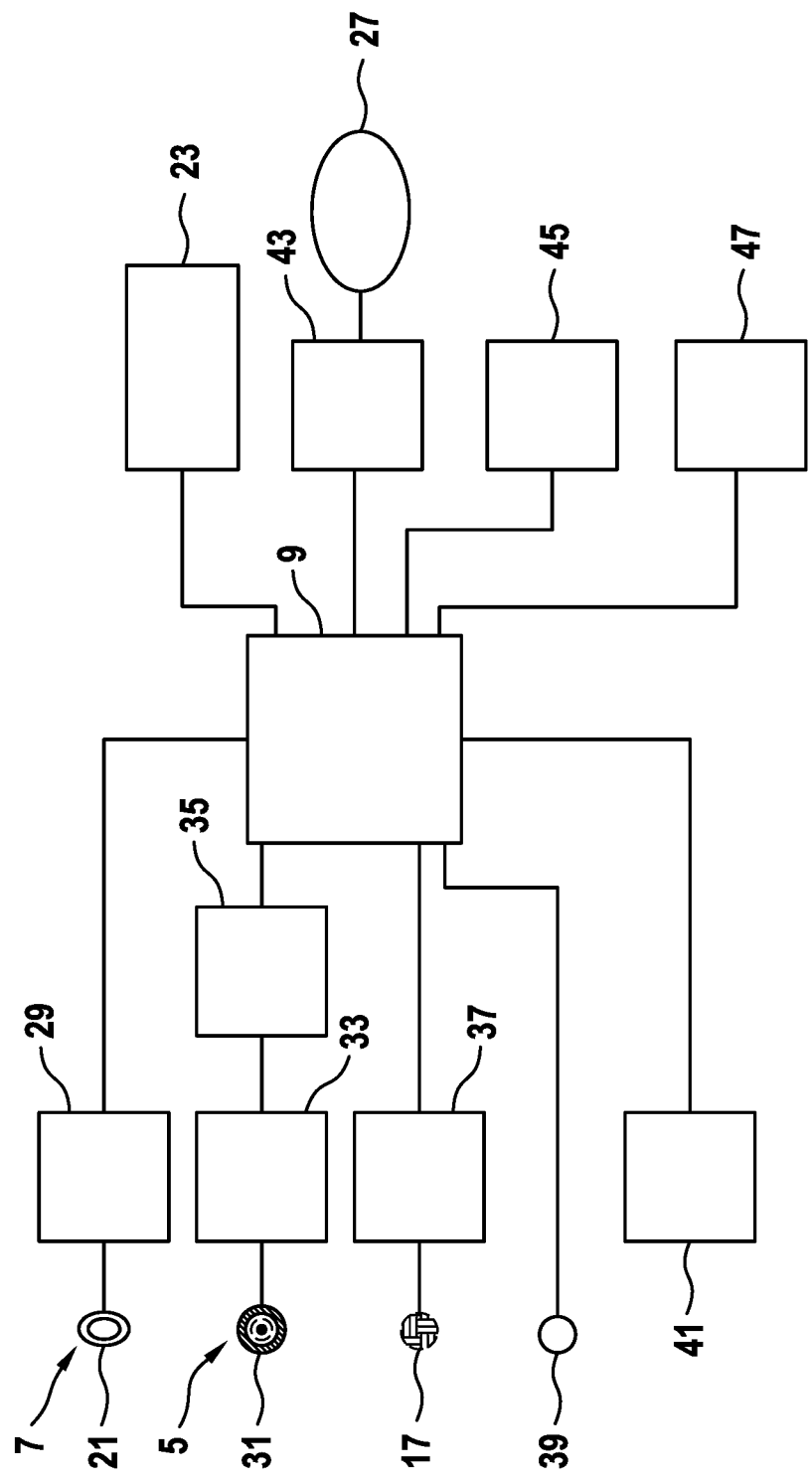
FIG. 4 shows components of a glove-like device according to the invention and their interconnection.

FIG. 4 shows a possible embodiment of electrical or electronic components to be provided for the implementation of the desired camera function in the glove-like device 1. Many of these components are optional only and may provide additional functions for the glove-like device 1. The components shown in FIG. 4 on the left are input devices, whereas output devices are shown on the right.

For triggering the contact signal, the switching arrangement 7 is designed with a button 21. A generated switching signal is first filtered by an anti-bouncer arrangement 29 ("debouncer") to ensure that a single actuation of the switching arrangement 7 leads to a single generation of a switching signal. The switching signal may then be forwarded to the central control unit 9.

The central processing unit 9 may then cause the camera 5 to take an image or a sequence of images. Camera 5 is equipped with an optics 31 and an image sensor 33. Signals from the image sensor 33 may pass through an A/D converter, if necessary.

In addition, a microphone may deliver 17 audio signals to the central control unit 9, if necessary, after they have passed through an audio processing unit 37 (Audio CODEC).

Furthermore, additional sensors 39 such as e.g. a proximity sensor 25 may supply signals to the central control unit 9.

The central control unit 9 may process the signals supplied by the switching arrangement 7, the camera 5, the microphone 17 and, if necessary, additional sensors 39 and/or control the components mentioned. For this purpose, it has at least one data-processing processor.

Images taken by the camera 5 may then be output on the display 23. A current status of the components implementing the camera function may be displayed using a status LED 27 controlled by a driver 43.

It is also possible to transmit images taken by the camera 5 of glove-like device 1 to other devices such as a mobile phone, for example, using a Bluetooth interface 45.

In addition, an internal memory 47 may be provided in which image data may be stored.

The electrical and electronic components described above may be powered with electric energy by a battery 41, preferably a lithium-ion battery.

Finally, it should be noted that terms such as "comprising", "including", etc. do not exclude any other elements or steps and terms such as "one" or "a" do not exclude a multitude. Reference signs in the claims are not to be regarded as restrictions.

LIST OF REFERENCE SIGNS

1 Glove-like device
3 Carrier structure
5 Camera
7 Switching arrangement
9 Central control unit
11 Cuff
13 Component to be actuated
14 Securing component
15 Actuating component
17 Microphone
19 Display
21 Push-button
23 Display
25 Proximity sensor
27 Status LED
29 Anti-bounce device
31 Optics
33 Image sensor
35 A/D converter
37 Sound processing unit
39 Sensor
41 Battery
43 Driver
45 Bluetooth interface
47 Internal memory
51 Thumb
53 Index finger
55 Index finger join

The invention claimed is:

1. Glove-like device, comprising: a carrier structure, a camera, a switching arrangement, wherein the camera is configured to take an image or a sequence of images upon receiving a contact signal, the carrier structure being configured to be attached without further provisions to a hand, a palm, and/or a wrist of a user such that, in a state pulled over the hand, at least parts of the carrier structure surround the hand of the user, the camera and the switching arrangement being integrated into the carrier structure, the glove-like device thereby being an integrated standalone device, and the switching arrangement comprising a component to be actuated which is arranged and configured such that it is actuated by an actuating movement of a thumb of the user towards a finger of the same hand and/or towards a finger joint of the same hand, thereby triggering the contact signal and forwarding it to the camera, the camera being integrated into the carrier structure at a position which lies on at least one of the heel and the palm of the hand, in the state pulled over the hand, the component to be actuated being integrated into the carrier structure at a position which, in the state pulled over the hand, lies on a side of the index finger joint opposite the thumb.

2. Glove-like device according to claim 1, the switching arrangement comprising a securing component which in a secured state prevents the triggering of the contact signal and which is converted to an unsecured state to permit the triggering of the contact signal by the actuation movement.

3. Glove-like device according to claim 1, the switching arrangement further comprising an actuating component and the switching arrangement being configured to generate the contact signal only when the actuating component is brought into mechanical contact with the component to be actuated.

4. Glove-like device according to claim 1, the camera being integrated into the carrier structure at a position which lies on the underside of the palm, in the state pulled over the hand.

5. Glove-like device according to claim 1, wherein the switching arrangement and/or the camera is encapsulated in a watertight manner.

6. Glove-like device according to claim 1, the switching arrangement further comprising an anti-bounce arrangement which suppresses generation of a plurality of switching signals by a single actuation movement.

7. Glove-like device according to claim 1, wherein the carrier structure is formed of a flexible, substantially not elastically stretchable material.

8. Glove-like device according to claim 1, further comprising a display which is integrated into the carrier structure and is configured to display images taken by the camera.

9. Glove-like device according to claim 8, wherein the display is a flexible display.

10. Glove-like device according to claim 8, wherein the display is integrated into the carrier structure at a position which lies on the back of the hand in the state pulled over the hand.

11. Glove-like device comprising: a carrier structure, a camera, a switching arrangement, wherein the camera is configured to take an image or a sequence of images upon receiving a contact signal, the carrier structure being configured to be attached without further provisions to a hand, a palm, and/or a wrist of a user such that, in a state pulled over the hand, at least parts of the carrier structure surround the hand of the user, the camera and the switching arrangement being integrated into the carrier structure, the glove-like device thereby being an integrated standalone device, and the switching arrangement comprising: a component to be actuated which is arranged and configured such that it is actuated by an actuating movement of a thumb of the user towards a finger of the same hand and/or towards a finger joint of the same hand, thereby triggering the contact signal and forwarding it to the camera, the camera being integrated into the carrier structure at a position which lies on at least one of the heel and the palm of the hand, in the state pulled over the hand; and an actuating component, the switching arrangement being configured to generate the contact signal only when the actuating component is brought into mechanical contact with the component to be actuated, wherein the component to be actuated comprises a contact and the actuating component comprises a magnet that closes the contact when approaching the component to be actuated.

12. Glove-like device according to claim 11, the component to be actuated being integrated into the carrier structure at a position which, in the state pulled over the hand, lies on a side of the index finger and/or the index finger joint opposite the thumb and the actuating component being integrated into the carrier structure at a position, which in the state pulled over the hand, lies on a side of the thumb opposite the index finger and/or the index finger joint.

13. Glove-like device according to claim 11, wherein the contact comprises a reed contact.

14. Glove-like device, comprising:
a carrier structure,
a camera,
a switching arrangement,
wherein the camera is configured to take an image or a sequence of images upon receiving a contact signal,
the carrier structure being configured to be attached without further provisions to a hand, a palm, and/or a wrist of a user such that, in a state pulled over the hand, at least parts of the carrier structure surround the hand of the user,
the camera and the switching arrangement being integrated into the carrier structure, and
the switching arrangement comprising a component to be actuated which is arranged and configured such that it is actuated by an actuating movement of a thumb of the user towards a finger of the same hand and/or towards a finger joint of the same hand, thereby triggering the contact signal and forwarding it to the camera, the camera being integrated into the carrier structure at a position which lies on at least one of the heel of the hand, the palm, and the wrist, in the state pulled over the hand,
the component to be actuated being integrated to the carrier structure at a position which, in the state pulled over the hand, lies on a side of the index finger joint opposite the thumb.

* * * * *